United States Patent
Van Stuyvenberg

(10) Patent No.: US 7,856,842 B2
(45) Date of Patent: *Dec. 28, 2010

(54) METHOD AND INSTALLATION FOR COOLING SLAUGHTERED POULTRY

(75) Inventor: Willem Marie Van Stuyvenberg, Enschede (NL)

(73) Assignee: Topkip B.V., Enschede (NL)

( * ) Notice: Subject to any disclaimer, the term of this patent is extended or adjusted under 35 U.S.C. 154(b) by 462 days.

This patent is subject to a terminal disclaimer.

(21) Appl. No.: 11/732,976

(22) Filed: Apr. 5, 2007

(65) Prior Publication Data

US 2007/0181010 A1    Aug. 9, 2007

Related U.S. Application Data

(62) Division of application No. 10/275,670, filed as application No. PCT/NL01/00334 on May 2, 2001, now Pat. No. 7,217,437.

(30) Foreign Application Priority Data

| May 9, 2000 | (NL) | .................................... 1015143 |
| Nov. 13, 2000 | (NL) | .................................... 1016591 |
| Dec. 20, 2000 | (NL) | .................................... 1016922 |

(51) Int. Cl.
*F25D 17/02* (2006.01)

(52) U.S. Cl. ......................................... 62/374; 62/380

(58) Field of Classification Search .................... 62/63, 62/64, 332, 374, 375, 380; 426/644, 506, 426/524; 99/470, 474

See application file for complete search history.

(56) References Cited

U.S. PATENT DOCUMENTS

| 2,100,838 A | * | 11/1937 | De Vout ........................ 34/223 |
| 2,920,462 A | | 1/1960 | Roser et al. |
| 3,092,975 A | | 6/1963 | Zebarth |
| 3,103,696 A | | 9/1963 | De Long |
| 3,164,967 A | | 1/1965 | Marshall |
| 3,689,958 A | * | 9/1972 | Dillon ........................ 99/517 |
| 3,729,773 A | * | 5/1973 | Dillon ........................ 426/524 |
| 4,196,221 A | * | 4/1980 | Dew ............................ 426/235 |
| 4,325,221 A | * | 4/1982 | Grewar .......................... 62/63 |
| 4,388,811 A | | 6/1983 | Zebarth |
| 4,788,831 A | | 12/1988 | Crawford et al. |

(Continued)

FOREIGN PATENT DOCUMENTS

DE     2737355 A     3/1978

(Continued)

*Primary Examiner*—Mohammad M Ali
(74) *Attorney, Agent, or Firm*—The Webb Law Firm

(57) ABSTRACT

The invention relates to a method for cooling slaughtered poultry, including the steps of: positioning the poultry with spread legs, with the abdominal cavity upward and oriented in the transporting direction of the poultry; and transporting the positioned poultry through cooled flowing water, wherein the transporting direction of the poultry is opposed to the flow direction of the water such that water flows around and through the poultry from the abdominal cavity toward the neck cavity. The present invention also relates to an installation including: a positioner for receiving the slaughtered poultry with the abdominal cavity oriented upward in the transporting direction; a transporter for transporting the positioned poultry; and a cooler including a container for cooled and flowing water, wherein the flow direction is opposed to the transporting direction, and to the treated poultry.

8 Claims, 5 Drawing Sheets

U.S. PATENT DOCUMENTS

| | | |
|---|---|---|
| 4,968,520 A | 11/1990 | Wang |
| 5,484,332 A * | 1/1996 | Leech et al. ................. 452/173 |
| 5,577,392 A | 11/1996 | Engler et al. |
| 5,595,066 A * | 1/1997 | Zwanikken et al. ............ 62/374 |
| 5,879,732 A * | 3/1999 | Caracciolo et al. ........... 426/231 |
| 5,939,115 A | 8/1999 | Kounev et al. |
| 6,167,709 B1 * | 1/2001 | Caracciolo et al. .............. 62/64 |
| 6,190,250 B1 * | 2/2001 | Volk et al. ................... 452/177 |
| 6,213,864 B1 * | 4/2001 | Griffiths et al. .............. 452/173 |

FOREIGN PATENT DOCUMENTS

| | | |
|---|---|---|
| DE | 3727079 A | 2/1989 |
| EP | 651215 A | 5/1995 |
| EP | 827695 A | 3/1998 |
| JP | 2100629 A | 4/1990 |
| WO | 9921429 A | 5/1999 |

\* cited by examiner

METHOD AND INSTALLATION FOR COOLING SLAUGHTERED POULTRY

CROSS REFERENCE TO RELATED APPLICATION

This application is a divisional of U.S. application Ser. No. 10/275,670 filed Jul. 16, 2003, which is the United States national phase of International Application No. PCT/NL01/00334 filed May 2, 2001, which designated, inter alia, the United States, and which claimed the benefit of Netherlands Application Nos. 1015143 filed May 9, 2000; 1016591 filed Nov. 13, 2000; and 1016922 filed Dec. 20, 2000.

BACKGROUND OF THE INVENTION

1. Field of the Invention

The present invention relates to a method and installation for cooling slaughtered poultry.

2. Description of Related Art

When poultry are slaughtered, legs, neck, feathers and entrails are removed. The slaughtered poultry then has to be cooled. Cooling with air has the drawback that it takes place over a long period of time and the slaughtered poultry acquires grey-yellow color with dark blotches. In addition, there occurs a weight loss (up to 3%).

According to another known method, slaughtered poultry is displaced in a screw spindle in counterflow to water. Because the poultry birds lie against each other in the spindle they are mangled, whereby insufficient cooling occurs and cooling must continue for a long period before a desired temperature of below +4° C. is reached. In addition, the amount of water used is considerable.

SUMMARY OF THE INVENTION

The present invention has for its object to provide a method and installation for cooling slaughtered poultry, wherein cooling takes place very rapidly. The slaughtered poultry hereby retains a healthy color, has a long storage time and there occurs substantially no weight loss. This cooling can take place by making use of only cooled flowing water, while the use of chemicals in whatever form can be dispensed with.

The present invention is based on the insight that the effectiveness of the cooling is enhanced not only by external cooling of the poultry but also by simultaneous internal cooling of the poultry, this while each poultry bird is subjected separately to the cooling. Vasoconstriction is enhanced because the breastbone is herein prevented from being pressed inward and by the rapid cooling, whereby no weight loss of the slaughtered poultry occurs during the cooling and the weight of the slaughtered poultry therefore remains substantially the same as the slaughtered weight. It will be apparent that any contamination which may be present on the poultry is also effectively removed by this method of cooling according to the invention. This results in a considerable decrease in the germ value.

The invention therefore provides a method for cooling slaughtered poultry, comprising of: i) positioning the poultry with spread legs, with the abdominal cavity upward and oriented in the transporting direction of the poultry; and ii) transporting the positioned poultry through cooled flowing water, wherein the transporting direction of the poultry is opposed to the flow direction of the water such that water flows round and through the poultry from the abdominal cavity toward the neck cavity. For the internal circulation and cooling of the slaughtered poultry it is important that the legs of the poultry be spread and the abdominal cavity be oriented upward in the transporting direction. Due to the opposed directions of the transporting direction of the poultry and the flow direction of the cooling water there occurs a thrust at the position of the open abdominal cavity of the poultry. Water will thereby pass from the abdominal cavity through the slaughtered poultry and leave the poultry via the neck cavity. According to a first embodiment the side of the body is oriented in the transporting direction. According to a second preferred embodiment the rear of the body is oriented in the transporting direction. Because the rear of the body is oriented in the transporting direction, the breastbone will not be pressed inward by the thrust of the water, so that flow through the poultry from abdominal cavity to neck cavity can take place.

Poultry is understood to mean all kinds of fowl, including chickens such as maternal animals, chicks and laying-hens, ducks, pheasants, guinea fowl, geese, turkeys and the like.

After cooling of the slaughtered poultry, further cooling can take place to the temperature for further processing. In order to avoid as far as possible any fouling of the cooling water, it is further recommended that the cooled poultry be allowed to drain. The chicken can thus drain and fouled water possibly present thereon can be removed prior to further cooling. It is therefore recommended that the poultry is then further cooled.

If the poultry is intended for the fresh-food market, it is recommended that the further cooled poultry is subjected to air cooling to below as from +4° C.

If the poultry is intended in particular for the frozen food market, it is recommended that the further cooled poultry is deep-frozen.

Another aspect of the invention relates to an installation for performing the above-stated method. This installation comprises: positioning means for receiving the slaughtered poultry with the abdominal cavity oriented upward in the transporting direction; transporting means for transporting the positioned poultry; and cooling means comprising an elongate container for cooled and flowing water, wherein the flow direction is opposed to the transporting direction.

The poultry can be oriented with the side of the body of the rear of the body in the transporting direction.

As stated above, it is further recommended that the positioning means comprise receiving members for receiving the legs of the poultry in spread manner. An elegant positioning is obtained if in further preference the receiving members comprise slots oriented in the transporting direction in which a poultry leg is hookingly received. It is hereby possible to arrange the poultry manually or automatically in the positioning means and to remove them easily therefrom after cooling. If placing of the poultry or removal of the poultry takes place in a direction transversely of the transporting direction, it is further recommended that the positioning means are connected via a rotatable frame to the transporting means. It is thus possible to carry out a transverse arranging or removing operation after rotation.

For the above-stated reasons it is further recommended that the installation further comprises a draining station connecting onto the cooling container, and optionally a further cooling means which connects onto the draining station and comprises a further cooling container for cooled and flowing water, wherein the flow direction is opposed to the transporting direction.

Owing to the rapid cooling of the slaughtered poultry the poultry retains a healthy white color, and has a shelf life for the fresh-food market of at least eight days. While gray colors and dark or rust patches practically do not occur. The cooling operation performed thereon in accordance with the method and installation according to the invention is therefore characteristically visible on the slaughtered poultry. Another feature of the poultry is that the slaughtered weight is substantially the same as the cooled weight. The uniform, white and natural color of the slaughtered poultry depends partly on the type of poultry and the poultry diet. It can be generally stated that the poultry obtained according to the invention has a uniform natural color, such as RAL 9010 or 9003 for maternal animals and chicks, and RAL 9001 or 1013 for laying-hens.

Mentioned and other features of the method and installation as well as the slaughtered poultry according to the invention will be further elucidated hereinbelow on the basis of an embodiment, which is given only by way of example without the invention being deemed limited thereto.

DETAILED DESCRIPTION OF THE INVENTION

Figure 1:
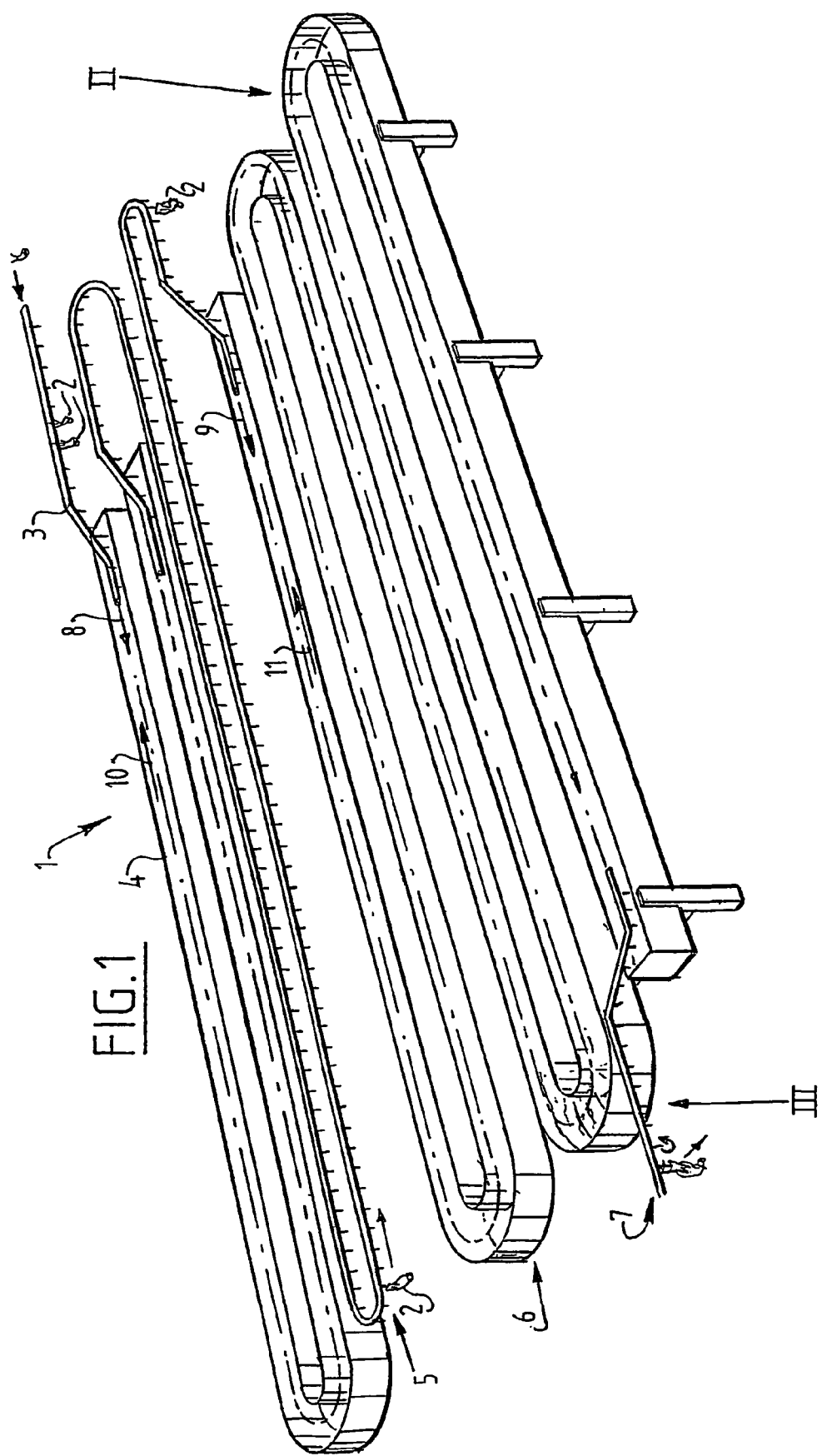
FIG. 1 is a schematic perspective view of the installation according to the invention.

FIG. 1 shows an installation 1 for cooling slaughtered poultry 2, in this case chickens. Installation 1 comprises a transport system 3 which passes through a hairpin bend-like cooling container 4, then through a draining station 5 and a further cooling container 6. From the station 7 the transport system 3 once again connects onto cooling container 4 in a manner not shown.

Cooling container 4 and further cooling container 6 are manufactured from stainless steel. Both containers lie at an inclination such that the transporting direction 8 in cooling container 4 and the transporting direction 9 in further cooling container 6 is opposed to the water flow direction 10 respectively 11 in cooling container 4 or further cooling container 6. The speed of the transport system and the length of cooling container 4 and further cooling container 6 and draining station 5 are chosen such that the chickens 2 remain for about 2-3 minutes in cooling container 4, drain for 3 minutes in draining station 5 and are in further cooling container 6 for about 7 minutes, when air cooling to the desired final temperature of for instance 4° C. is subsequently reached, or further cooling with the same system until the desired final temperature is reached (of for instance 4° C.).

The cooling water in cooling container 4 and in further cooling container 6 can be cooled via cooling means (not shown) or can be provided with ice in order to obtain a temperature below 4° C.

Figure 2:
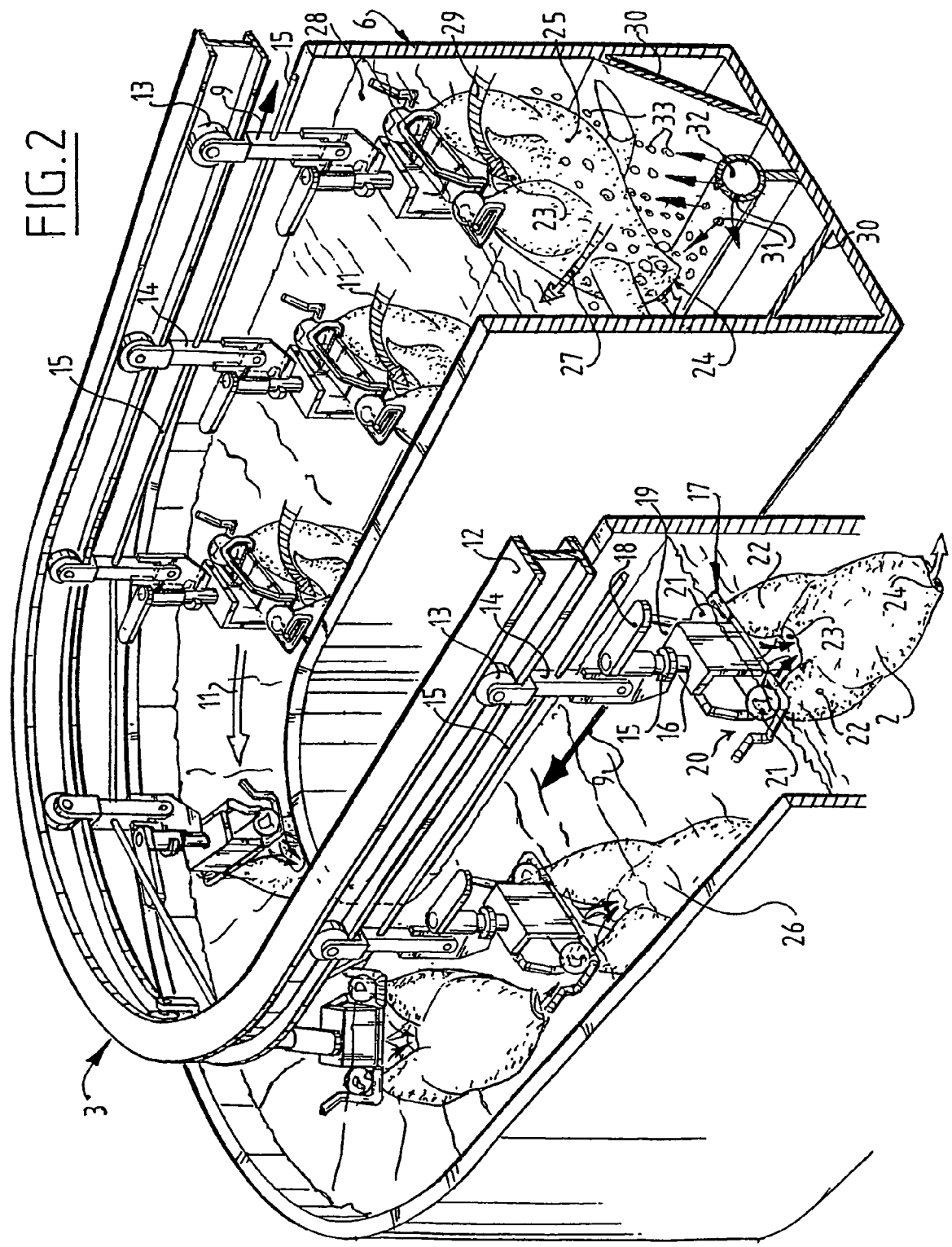
FIG. 2 is a schematic perspective view on a larger scale of a broken-away view of detail II of FIG. 1.

FIG. 2 shows the further cooling of chickens 2 in more detail.

Transport system 3 comprises a transport rail 12 along which a transport frame 14 passes via wheels 13. Transport frames 14 are mutually connected via a link 15.

Each transport frame 14 is provided with an eye 15 in which a shaft 16 of positioning means 17 is rotatably received. Shaft 16 ends in a stop 18 which, during transport as according to arrow 9 in FIG. 2, presses against a stop 19. In this position the receiving members 20 are oriented in the transporting direction, wherein open slots 20, hooking on the knee joint 21, receive legs 22 of chicken 2 in this direction 9. In this position the legs 22 are hookingly received in slots 20 in spread manner. Abdominal cavity 23 is oriented upward and neck cavity 24 is oriented downward. The rear of the body 25 is oriented in the transporting direction 9 and counter to the water flow direction 11. The front of the body 26 with the breastbone is oriented in the other direction. Owing to the displacement of chicken 2 counter to the flow direction 11, water 27 flows round the chicken 2 at the sides and the chicken is cleaned and cooled on the outside with water 28. Owing to the thrust of water at the position of the abdominal cavity 23, which communicates with neck cavity 24 via the interior of chicken 2, an internal flow of water 29 is created whereby chicken 2 is also cooled internally.

The further cooling container 6 is manufactured from stainless steel and is provided with baffles 30 which guide settling dirt which may be present toward the middle of container 6. Located here is an air pipe 32 with downward directed holes 32 through which air is blown, so that air bubbles 33 cause an agitation and swirling in the water 28. This enhances cooling.

Although the operation of only the further cooling container 6 is described in detail in FIG. 2, it will be apparent that the same cooling process takes place in cooling container 4, which has the same construction but has a shorter length because of the shorter post-cleaning and cooling operations performed therein.

In draining station 5 the chicken 2 passes through suspended from the slots 20 of receiving members 19, while water, which is collected in a tank (not shown) can drain away from the outside and inside. The chicken 2 suspended from the transport system 3 is herein situated in cool air so that warming of the chicken is avoided.

Figure 3:
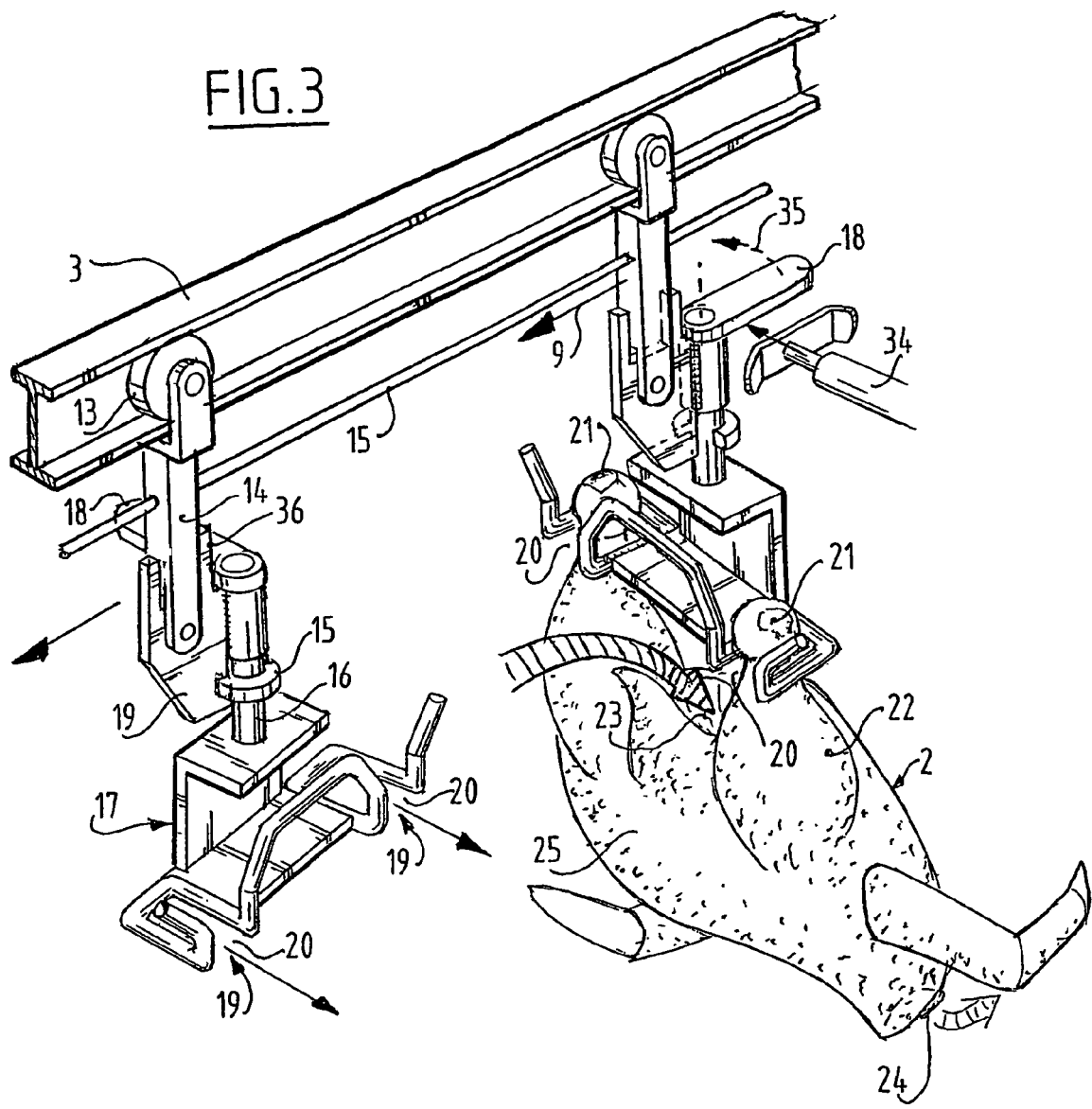
FIG. 3 is a schematic perspective view on a different scale of the removal operation at the position of detail III in FIG. 1.

FIG. 3 shows the transfer of chicken 2 from the transport system 3. Using a stop guide 34 the stop 18 is rotated in the direction of arrow 35 and strikes against a stop 36. The slots 20, with the legs 22 of chicken 2 therein, are hereby rotated and displaced, in this case counter-clockwise, in a direction transversely of transporting direction 9. Chicken 2 can hereby be taken out of slots 20 transversely of the transporting direction 9 and transferred into another transport system which feeds the chickens for instance to a device for dividing chicken 2. It is also possible for the chicken to be fed to a device for performing an air cooling of the further cooled chickens 2, or to a device for deep-freezing chickens 2, this depending on the further use of the chicken for the fresh-food market or the frozen-food market.

Figure 4:
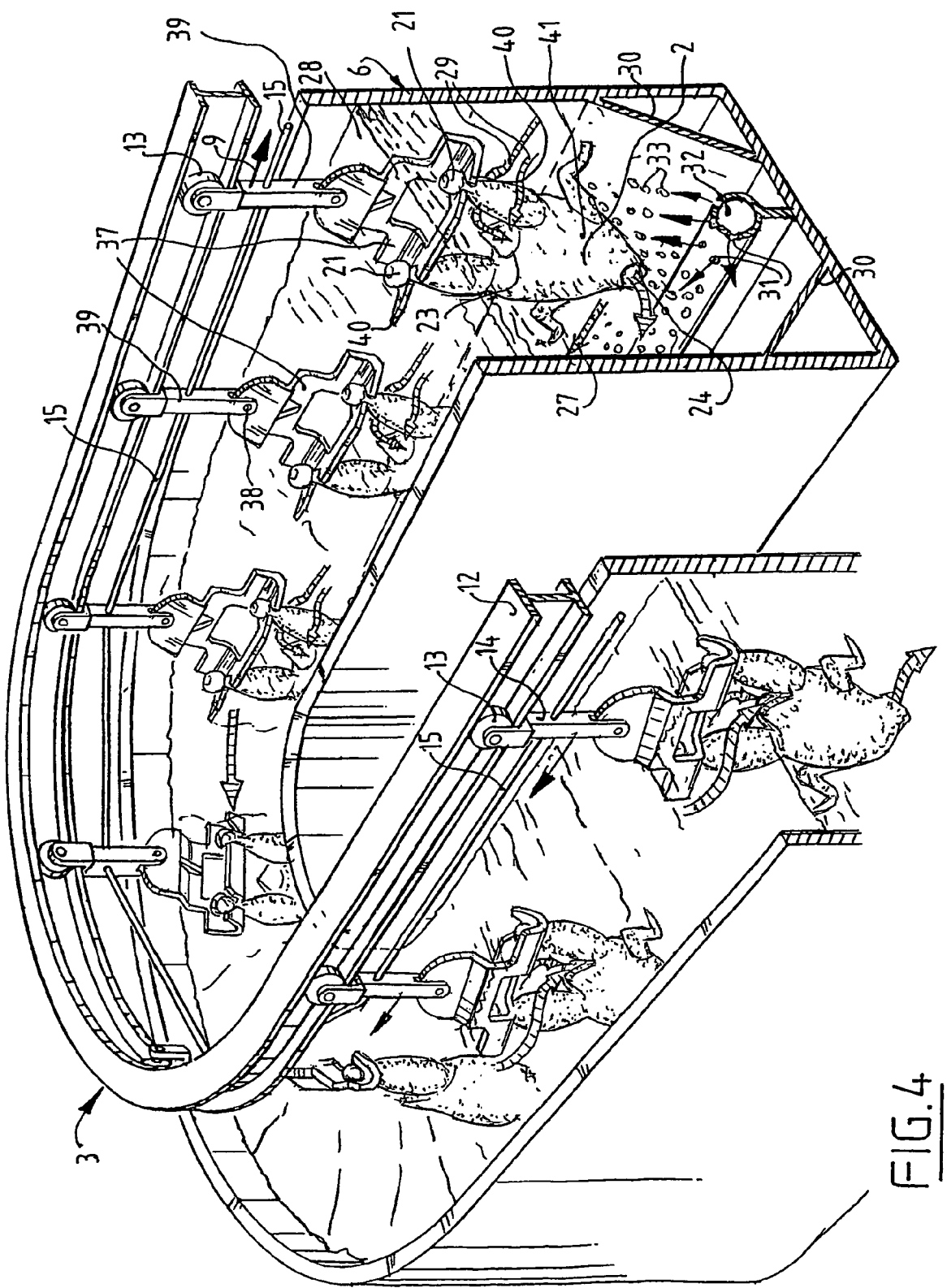
FIGS. 4 and 5 are schematic perspective views of another variant of the installation according to the invention.

FIG. 4 shows a variant corresponding with FIG. 2 of the transport system 3. Each transport frame 14 comprises a cradle 37 which is connected to a transport rod 39 for pivoting on a pin 38.

Each cradle 37 is provided with receiving members 40 for hookingly receiving the knee joint 21 of a chicken 2. The abdominal cavity 23 is oriented upward and the neck cavity 24 oriented downward. The side of the body 41 is oriented in the transporting direction 9 and counter to the water flow direction 11. Water 27 flows round the sides of chicken 2. The thrust of water at the position of the side of the body 41 results in an internal flow of water 29 whereby chicken 2 is cooled internally. Owing to the thrust and tilting of cradle 37 round pin 38 the abdominal cavity 23 will be oriented in the direction of the water flow 29, thereby ensuring a good internal flow.

Figure 5:
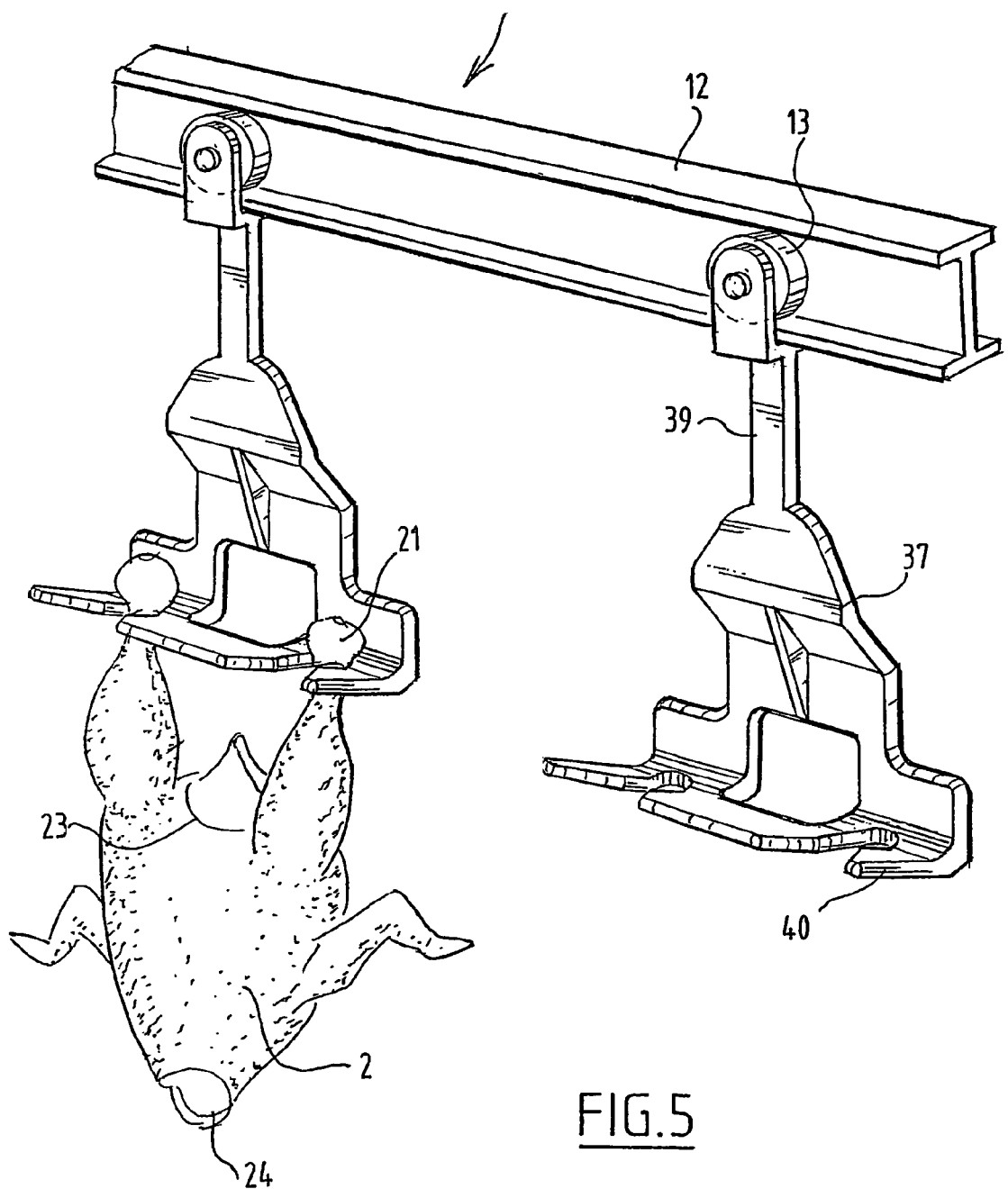

FIG. 5 shows a variant of the transport system 3 shown in FIG. 4. In this case the cradle 37 is rigidly connected to rod 39, whereby during transport through the cooling containers the abdominal cavity 23 is not oriented in the direction of the water flow 29. An adequate internal cooling of chicken 2 is nevertheless ensured.

After the air cooling, deep-freeze cooling and/or packaging the chicken 2 possesses a natural, uniform color and is substantially free of dark blotches and yellow discolored patches. This is obtained due to the rapid cooling. Moisture loss is prevented by the vasoconstriction occurring herein. The weight loss relative to the slaughtered weight is even zero in many cases. The color of the cooled chicken according to the invention has a natural slaughter color. For maternal animals, hens and chicks this color can be the same in many cases as that of RAL 9010 or 9003. For laying-hens the color usually corresponds with RAL 9001 and 1013. It is however noted that, depending on diet, the color of the chicken can vary, and also as a result of differences in breed. It remains important however that unnatural discoloration and dark coloring are avoided by the invention owing to the efficient cooling.

The invention claimed is:

1. An installation for cooling slaughtered poultry, comprising:
   i. positioning means for receiving the slaughtered poultry with the abdominal cavity oriented upward in a transporting direction;
   ii. transporting means for transporting the positioned poultry; and
   iii. cooling means comprising a container defining a channel having a first end and a second end, wherein cooled and flowing water flows through the channel from the second end of the channel to the first end of the channel, wherein the transporting means transports the poultry through the channel from the first end of the channel to the second end of the channel through the cooled flowing water in the container, opposed to a flow direction of the water, the water flowing around and through the poultry from the abdominal cavity toward the neck cavity.

2. The installation as claimed in claim 1, wherein the positioning means orient the poultry with a side of the body in the transporting direction.

3. The installation as claimed in claim 1, wherein the positioning means orient the poultry with the rear of the body in the transporting direction.

4. The installation as claimed in claim 1, wherein the positioning means comprise receiving members for receiving the legs of the poultry in spread manner.

5. The installation as claimed in claim 4, wherein the receiving members comprise slots oriented in the transporting direction in which a poultry leg is hookingly received.

6. The installation as claimed in claim 1, wherein the positioning means are connected via a rotatable frame to the transporting means.

7. The installation as claimed in claim 1, comprising a draining station connected to the cooling container.

8. The installation as claimed in claim 7, comprising a further cooling means which is connected to the draining station and comprises a further cooling container for cooled and flowing water, wherein a flow direction is opposed to the transporting direction.

* * * * *